(12) United States Patent
Mizutani et al.

(10) Patent No.: US 9,653,864 B2
(45) Date of Patent: May 16, 2017

(54) WIRE STRAIGHTENING APPARATUS

(75) Inventors: Tatsuya Mizutani, Yokkaichi (JP); Yoshiaki Hattori, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 500 days.

(21) Appl. No.: 14/347,817

(22) PCT Filed: Feb. 27, 2012

(86) PCT No.: PCT/JP2012/054700
§ 371 (c)(1),
(2), (4) Date: Mar. 27, 2014

(87) PCT Pub. No.: WO2013/057968
PCT Pub. Date: Apr. 25, 2013

(65) Prior Publication Data
US 2014/0216594 A1    Aug. 7, 2014

(30) Foreign Application Priority Data
Oct. 20, 2011  (JP) ................................ 2011-230564

(51) Int. Cl.
*H02G 1/14* (2006.01)
*H01R 43/28* (2006.01)
(Continued)

(52) U.S. Cl.
CPC ............ *H01R 43/28* (2013.01); *B21C 47/34* (2013.01); *B21F 1/02* (2013.01); *B65H 57/04* (2013.01);
(Continued)

(58) Field of Classification Search
CPC  B21F 1/02; B21C 47/34; H01R 43/28; B65H 57/14; B65H 57/26; B65H 57/04; H02G 1/14
(Continued)

(56) References Cited

U.S. PATENT DOCUMENTS 1,914,975 A * 6/1933 Nigro ........................ B21F 1/02
72/164
3,260,092 A * 7/1966 Greven ................... B21C 47/34
72/161
(Continued)

FOREIGN PATENT DOCUMENTS

JP          U-6-58588          8/1994
JP       A-2003-334627        11/2003
(Continued)

OTHER PUBLICATIONS

Sep. 5, 2013 International Preliminary Report on Patentability cited in PCT/JP2012/054700 (with English Translation).
(Continued)

*Primary Examiner* — David B Jones
(74) *Attorney, Agent, or Firm* — Oliff PLC (57) ABSTRACT

A wire straightening apparatus that straightens kinks of a wire that is fed along a wire feeding path includes one or a plurality of straightening mechanisms. Each straightening mechanism includes a plurality of first straightening rollers and one or a plurality of second straightening rollers. Each roller has a groove along its outer periphery, the groove gradually deepening toward a bottom portion. The bottom portion of the groove of each first straightening roller is spaced from the wire feeding path in a first direction, and the bottom portion of the groove of each second straightening roller is spaced from the wire feeding path in a second direction opposite to the first direction. With this structure, the wire can be made to follow a path that meanders as viewed from a direction perpendicular to axes of the straightening rollers.

10 Claims, 8 Drawing Sheets

(51) Int. Cl.
   *B21C 47/34* (2006.01)
   *B21F 1/02* (2006.01)
   *B65H 57/04* (2006.01)
   *B65H 57/14* (2006.01)
   *B65H 57/26* (2006.01)

(52) U.S. Cl.
   CPC ............ *B65H 57/14* (2013.01); *B65H 57/26* (2013.01); *H02G 1/14* (2013.01)

(58) Field of Classification Search
   USPC ........................................................ 140/147
   See application file for complete search history.

(56) References Cited

U.S. PATENT DOCUMENTS

| | | | | |
|---|---|---|---|---|
| 4,949,567 | A | * | 8/1990 | Corbin ..................... B21F 1/02 72/160 |
| 5,768,930 | A | * | 6/1998 | Eckehard ................. B21F 1/02 72/164 |

FOREIGN PATENT DOCUMENTS

| | | |
|---|---|---|
| JP | A-2007-044734 | 2/2007 |
| JP | A-2007-115433 | 5/2007 |

OTHER PUBLICATIONS

International Search Report issued in International Application No. PCT/JP2012/054700 mailed Apr. 24, 2012.

\* cited by examiner

WIRE STRAIGHTENING APPARATUS

BACKGROUND

This invention relates to a technology of straightening wire kinks.

In general, a wire with a terminal is manufactured by adjusting a continuously supplied wire to a specified length and cutting the wire, removing a coating at an end portion of the cut wire, and crimping the terminal to an exposed portion of a core wire. Here, the wire is supplied in a step of manufacturing a wire with a terminal in a state in which the wire is wound about and housed in a winding reel or the like, is extended from the winding reel, and is supplied to various processing. The wire that is thus wound about a winding reel or the like may have kinks such as winding kinks, and prior to performing various processing such as terminal crimping processing, straightening of the wire kinks in advance is required.

Patent Reference 1 discloses a wire straightening apparatus that straightens wire kinks. In this wire straightening apparatus, a plurality of straightening rollers spaced apart from each other are rotatably journaled to a lower frame body, and another plurality of straightening rollers spaced apart from each other are positioned between the plurality of straightening rollers journaled to the lower frame body, and are rotatably journaled to an upper frame body so as to, together with each of the straightening rollers on the lower frame body, pinch and press a wire that is to have its kinks straightened. The straightening rollers are formed in a shape in which a cross section forms a V shape. In this wire straightening apparatus, by (i) inserting a wire between the plurality of straightening rollers rotatably journaled to the lower frame body and the other plurality of straightening rollers rotatably journaled to the upper frame body and (ii) feeding the wire by a separate wire feeding mechanism, the wire is pressed between the plurality of straightening rollers and the other plurality of straightening rollers. Thus, as the wire is inserted through the plurality of straightening rollers and the other plurality of straightening rollers, wire kinks are straightened.

For example, in a step of manufacturing a wire with a terminal, this wire straightening apparatus is arranged upstream from a wire feeding mechanism of a length-adjusting device, and kinks of a wire that is extended from a winding reel by being fed by the wire feeding mechanism are straightened. Furthermore, the fed wire whose length is adjusted to a specified dimension by a length-adjusting device is cut to a specified dimension by a cutting device.

Patent Reference 1: Japanese Published Utility Model Application 6-58588

SUMMARY

Because wires whose length has been adjusted to a specified dimension by a length-adjusting device, and which are fed, as described above, are cut to a specified dimension by a cutting device, the wire feeding mechanism is suspended every time the wire is fed to a specified dimension. Additionally, in a step of manufacturing a wire with a terminal, a specified number of the same type of wire with terminals may be manufactured by lot production. When a specified number of wires with terminals is manufactured in a production lot, a wire feeding mechanism of a length-adjusting device is temporarily suspended. In these suspended states, the wire is pinched and pressed among a plurality of rollers. Because of this, in a suspended state (particularly when there is a long suspension), the wire that is pinched among a plurality of rollers may have bending kinks.

Furthermore, in order to suppress a wire from having bending kinks, the rollers that pinch the wire may be spaced far apart from each other. However, in this case, the kink straightening effect deteriorates.

Thus, an object of this invention is to suppress a wire from having kinks while feeding of the wire is suspended, while maintaining a kink straightening effect.

In embodiments, there is provided a wire straightening apparatus that straightens kinks of a wire that is fed along a wire feeding path, comprising:
one or a plurality of straightening mechanisms,
each straightening mechanism comprising:
a first support portion;
a second support portion that is arranged facing the first support portion;
a plurality of first straightening rollers spaced apart in a direction along the wire feeding path, each first straightening roller having (i) an outer periphery and (ii) a groove along the outer periphery, the groove gradually deepening toward a bottom portion, each first straightening roller being rotatably mounted on the first support portion; and
one or a plurality of second straightening rollers, each second straightening roller having (i) an outer periphery and (ii) a groove along the outer periphery, the groove gradually deepening toward a bottom portion, each second straightening roller being rotatably mounted on the second support portion, an axis of each second straightening roller being between respective axes of two of the first straightening rollers in the direction along the wire feeding path.

Furthermore, the bottom portion of the groove of each first straightening roller is spaced from the wire feeding path in a first direction, and the bottom portion of the groove of each second straightening roller is spaced from the wire feeding path in a second direction opposite to the first direction.

Each first and second straightening roller has a center, in a rotational axis direction, and may be formed in a shape such that the bottom portion of the groove is shifted from the center in the rotational axis direction.

The wire straightening apparatus may include a plurality of the straightening mechanisms, wherein at least one of the straightening mechanisms is set such that intervals between the first and second straightening rollers in the direction along the wire feeding path are different from intervals between the first and second straightening rollers in the direction along the wire feeding path in another of the straightening mechanisms.

The intervals between the first straightening rollers and second straightening rollers in the direction along the wire feeding path may be set to be larger in a downstream-side straightening mechanism than in an upstream-side straightening mechanism.

The first and second support portions may be arranged so as to be relatively movable in directions of contact with and separation from each other. The straightening mechanisms may be further provided with urging portions that relatively urge the first and second support portions into proximity with each other. An urging force of the urging portion of the upstream-side straightening mechanism may be set to be smaller than that of the urging portion of the downstream-side straightening mechanism.

According to the wire straightening apparatus described above, the bottom portion of the groove of each first straightening roller is spaced from the wire feeding path in a first direction, and the bottom portion of the groove of each second straightening roller is spaced from the wire feeding path in a second direction opposite to the first direction. Thus, in a wire feeding suspension state, the wire is displaced from the wire feeding path to a path close to the bottom portions of the grooves of the each of the first straightening rollers or each of the second straightening rollers due to the bending strength of the wire itself.

Additionally, in a wire feeding state, the wire is inserted through the wire feeding path and contacts the outer circumferential surfaces of each of the first straightening rollers or each of the second straightening rollers, which have a larger diameter than the bottom portions of the grooves, while receiving a pressing force from the each of the first straightening rollers and each of the second straightening rollers. In this state, the wire passes between the plurality of first straightening rollers and the plurality of second straightening rollers. By so doing, wire kinks can be suppressed in a wire feeding suspension state, and the kink straightening effect can be maintained.

Additionally, each first and second straightening roller has a center, in a rotational axis direction, and may be formed in a shape such that the bottom portion of the groove is shifted from the center in the rotational axis direction. Thus, the plurality of first straightening rollers may be arranged at positions in which the bottom portions of the grooves are shifted to one side of the wire feeding path in the rotational axis direction, and opposite to the plurality of first straightening rollers in the rotational axis direction, the plurality of second straightening rollers are arranged at positions in which the bottom portions of the grooves are shifted to the other side of the wire feeding path in the rotational axis direction. Thus, the dimension of the straightening mechanism in the rotational axis direction can be reduced, and space reduction can be accomplished.

The wire straightening apparatus may include a plurality of the straightening mechanisms, wherein at least one of the straightening mechanisms is set such that intervals between the first and second straightening rollers in the direction along the wire feeding path are different from intervals between the first and second straightening rollers in the direction along the wire feeding path in another of the straightening mechanisms. Therefore, the kinks of wires of a plurality of types of wire diameters can be straightened.

The intervals between the first straightening rollers and second straightening rollers in the direction along the wire feeding path may be set to be larger in a downstream-side straightening mechanism than in an upstream-side straightening mechanism, so the kink straightening effect can be improved.

The straightening mechanisms may be provided with urging portions that relatively urge the first and second support portions, which are arranged so as to be relatively movable in directions of contact with and separation from each other, into proximity with each other. An urging force of the urging portion of the upstream-side wire straightening mechanism may be set such that the urging force is smaller than that of the urging portion of the downstream-side wire straightening mechanism. Thus, in the upstream-side wire straightening mechanism, in which the intervals between the plurality of first and second straightening rollers in the direction along the wire feeding path are small, and resistance against extending the wire tends to become large, even a large-diameter wire with a high bending strength can be smoothly extended.

DETAILED DESCRIPTION OF EMBODIMENTS

The following explains a structure of a wire straightening apparatus. The wire straightening apparatus is an apparatus that straightens kinks in a wire such as winding kinks, bending kinks, or the like.

For example, the wire straightening apparatus is used in a step of manufacturing a wire with a terminal. That is, a wire with a terminal is manufactured by extending a wire that is wound about and housed in a winding reel, adjusting it to a specified dimension, feeding it, and cutting it at the specified dimension, removing a coating at an end portion of the cut wire, and crimping the terminal to an exposed portion of a core wire. This wire with a terminal is manufactured by a cutter having a length-adjusting device, a cutting device, and a terminal crimping device, and the like. However, if there are kinks in the wire, the wire may be out of a handling position (path) of a wire in each device of the cutter, and a processing failure such as a crimping failure may occur. Additionally, if a plurality of wires with terminals that have been manufactured are bundled, uniformity may also deteriorate. Because of this, straightening of wire kinks in advance is required.

Figure 1:
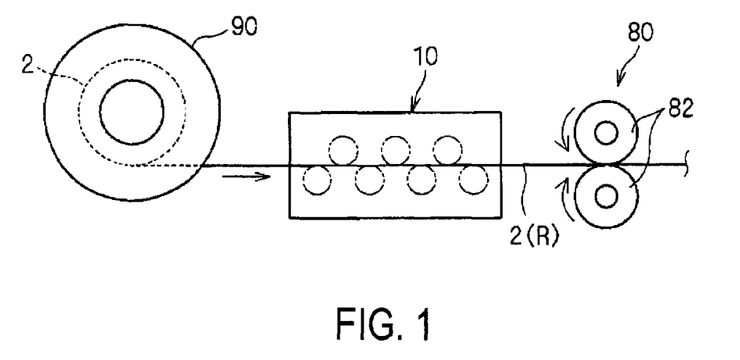
FIG. 1 is a diagram showing an exemplary arrangement of a wire straightening apparatus.

Here a wire straightening apparatus 10 is arranged upstream from a wire feeding mechanism 80 of a length-adjusting device of a cutter, that is, arranged between the wire feeding mechanism 80 and a winding reel 90 (see FIG. 1).

<Wire Feeding Mechanism>

The wire feeding mechanism 80 is a device that is provided with a pair of wire feeding rollers 82 and feeds a wire 2 along a wire feeding path R to a downstream side by rotating the pair of wire feeding rollers 82 in a state in which the wire 2 is sandwiched between the pair of wire feeding the rollers 82. Here, the wire feeding path R is a linear path through which the fed wire 2 is inserted. The pair of wire feeding rollers 82 is rotatably driven by an undepicted driver. Furthermore, the wire feeding mechanism 80 is constituted so as to adjust the length of the wire 2 to a specified dimension and feed it according to the type of a wire with a terminal to be manufactured. That is, the wire feeding mechanism 80 feeds the wire 2 to a specified dimension and temporarily suspends it, and repeats the operation of feeding to a specified dimension. Additionally, the wire feeding mechanism 80 is also suspended when a lot production of a wire with a type of terminal is complete, and the like.

<Overall Structure of Wire Straightening Apparatus>

A wire straightening apparatus 10 is an apparatus that straightens kinks of the wire 2 that is fed along the wire feeding path R, and is provided with one or a plurality of wire straightening mechanisms. Here, the wire straightening apparatus 10 is provided with two wire straightening mechanisms. Among them, a wire straightening mechanism that is arranged on an upstream side of the wire feeding path R is called an upstream-side wire straightening mechanism 121, and a wire straightening mechanism that is arranged on a downstream side of the wire feeding path R is called a downstream-side wire straightening mechanism 122. The respective wire straightening mechanisms 121 and 122 are provided with a first support portion 22, a second support portion 24, an urging portion, a plurality of first straightening rollers 501, and a plurality of second straightening rollers 502 (see FIGS. 2-5).

Schematically, the wire straightening apparatus 10 straightens kinks of the wire 2 by extending the wire 2, which is guided to the wire feeding path R, between the plurality of first straightening rollers 501 that are supported by the first support portion 22 and the plurality of second straightening rollers 502 that are supported by the second support portion 24.

The first support portions 22 and the second support portions 24 are portions that support the plurality of first straightening rollers 501 and the plurality of second straightening rollers 502. The first support portions 22 and the second support portions 24 are formed, for example, in a flat, substantially rectangular parallelepiped shape. Additionally, the first support portions 22 and the second support portions 24 are arranged so as to be opposite to each other and relatively movable in directions of contacting and separating from each other. Here, the first support portions 22 and the second support portions 24 are relatively movable in directions of contacting and separating from each other by a sliding shaft mechanism. More specifically, the first support portions 22 are fixed to a base portion 20 as a foundation, and the second support portions 24 are arranged so as to be slidably movable with respect to the first support portions 22.

On the first support portions 22, pairs of sliding shafts 23 are arranged, which protrude in one direction. Additionally, on the second support portions 24, pairs of bearing portions 25 are arranged, which are insertable through the pairs of sliding shafts 23 of the first support portions 22. That is, in a state in which the pairs of sliding shafts 23 of the first support portions 22 are inserted through the bearing portions 25 of the second support portions 24, the second support portions 24 are slidably moved with respect to the first support portions 22.

Hereafter, a contacting/separating direction of the first support portions 22 and the second support portions 24 is sometimes referred to simply as a contacting/separating direction.

Additionally, a proximate position of the first support portions 22 and the second support portions 24 is determined by stoppers 28. Pairs of the stoppers 28 protrude toward the first support portions 22 and are arranged on the second support portions 24. Here, the stoppers 28 are bolts that are engaged to the second support portions 24, and are arranged so that the amount of their protrusion is variable. That is, at a position in which the stoppers 28 contact the first support portions 22, proximate movement of the second support portions 24 with respect to the first support portions 22 is restricted.

The plurality of first straightening rollers 501 (four first straightening rollers 501 here) spaced apart from each other in a direction along the wire feeding path R are rotatably journaled to the first support portions 22. Additionally, the plurality of second straightening rollers 502 (three second straightening rollers 502 here) spaced apart from each other in a direction along the wire feeding path R are rotatably journaled to the second support portions 24 at respective positions at sides of the plurality of first straightening rollers 501 (between the first straightening rollers 501 here) in the direction along the wire feeding path R. More specifically, the respective pluralities of straightening rollers 501 and 502 are rotatably supported about axes (that is, about respective parallel axes) along directions perpendicular to (i) the contacting/separating directions of the first support portions 22 and the second support portions 24 and (ii) the direction along the wire feeding path R. Additionally, the respective pluralities of first and second straightening rollers 501 and 502 are alternatingly arranged so as to sandwich the wire feeding path R.

Furthermore, shapes and arrangements of the respective first and second straightening rollers 501 and 502 will be discussed in detail after the overall structure of the wire straightening apparatus 10 is explained.

The first support portions 22 and second support portions 24 are arranged so as to be drivable relative to each other in contacting/separating directions by air cylinders 30. The air cylinders 30 are members that can move advance/retreat portions between an advanced state and a retreated state with respect to a main body portion. These air cylinders 30 each have a main body portion fixed to a base portion 20, and a tip end portion of the advance/retreat portion fixed to the second support portion 24, and drive the second support portions 24 in directions of contact and separation with respect to the first support portion 22.

Here, when the advance/retreat portions of the air cylinders 30 are in a retreated state, a relative position of the first support portions 22 and the second support portions 24 is called a separated position. A relative position of the first support portions 22 and the second support portions 24 in a state in which the stoppers 28 contact the first support portions 22 is called a proximate position. More specifically, the separated position of the first support portions 22 and the second support portions 24 is a position in which the plurality of first straightening rollers 501 and the plurality of second straightening rollers 502 do not contact the wire 2 that is guided to the wire feeding path R, that is, is a position in which an interval between the first support portions 22 and the second support portions 24 is larger than a diameter of the wire 2. Additionally, the proximate position is a position in which at least each of the straightening rollers 501 and 502 contacts an outer circumferential surface of the wire 2 that is guided to the wire feeding path R, at both sides in the contacting/separating direction.

Furthermore, the air cylinders 30 also function as urging portions that can relatively urge the first support portions 22 and the second support portions 24 into proximity More specifically, the air cylinders 30 are arranged so as to cause an urging force to act on the second support portions 24, from the position in which the stoppers 28 contact the first support portions 22 in a direction that brings the second support portions 24 closer to the first support portions 22. That is, with respect to the air cylinders 30, the advanced position of the advance/retreat portions is set farther forward, in a direction of proximity, than the position in which the stoppers 28 contact the first support portion.

An example was used in which the urging portions are the air cylinders 30. However, any urging portions that can relatively urge the first support portions 22 and the second support portions 24 into proximity are acceptable. Coil springs or the like can also be used.

Figure 2:
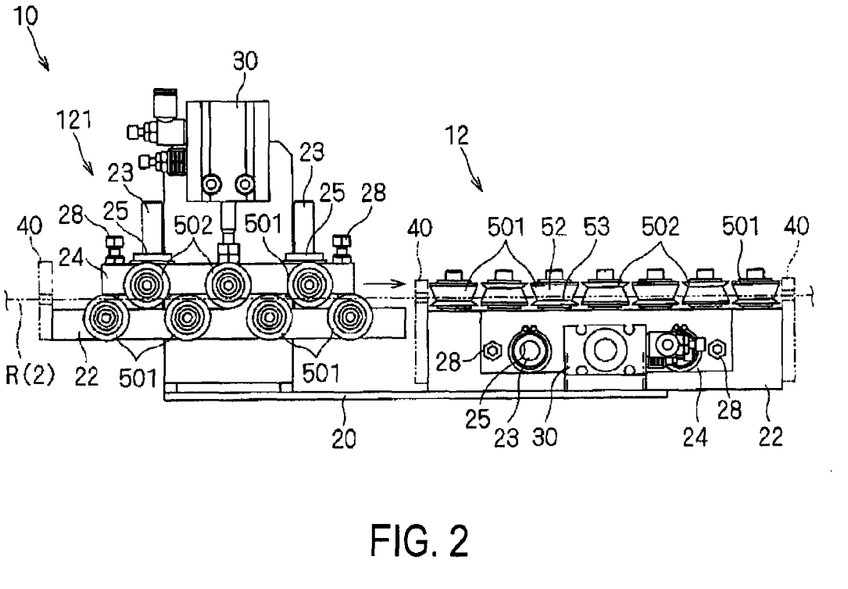
FIG. 2 is a side view of the wire straightening apparatus.
Figure 3:
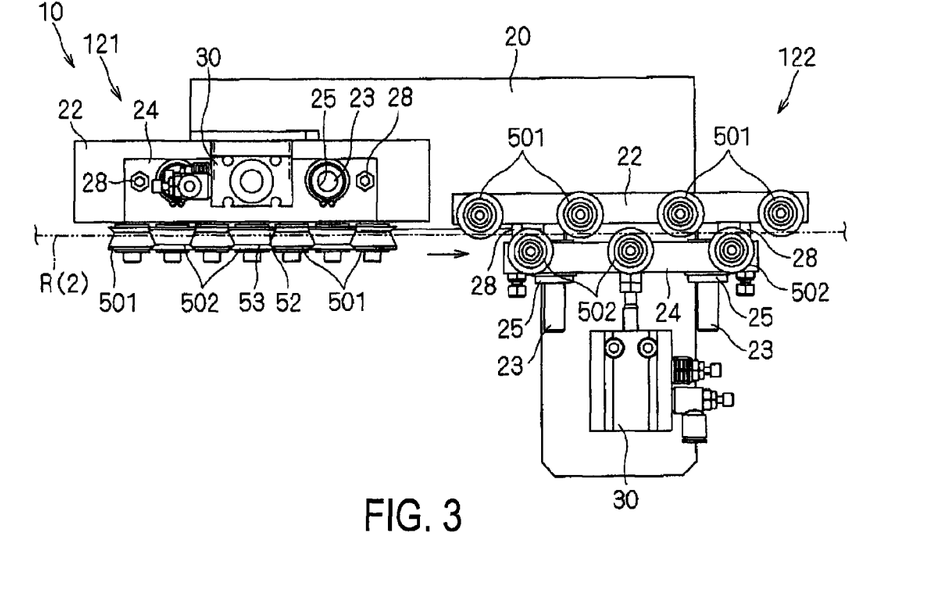
FIG. 3 is a plan view of the wire straightening apparatus.
Figure 4:
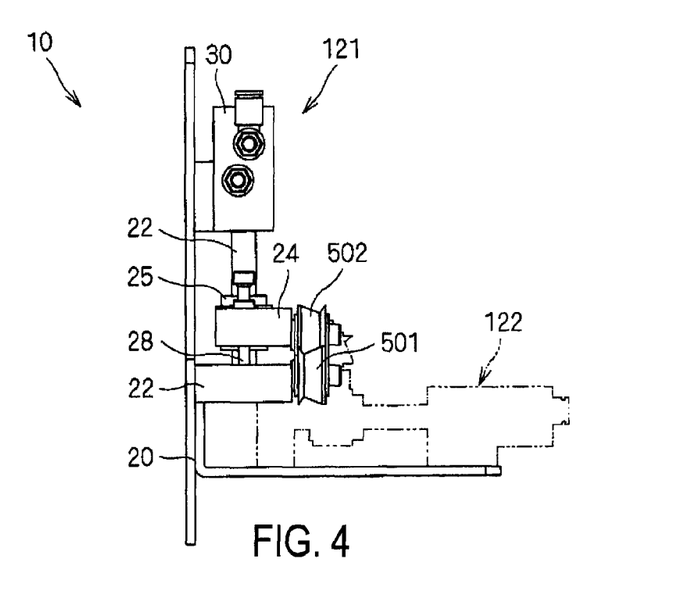
FIG. 4 is a front view of the wire straightening apparatus.
Figure 5:
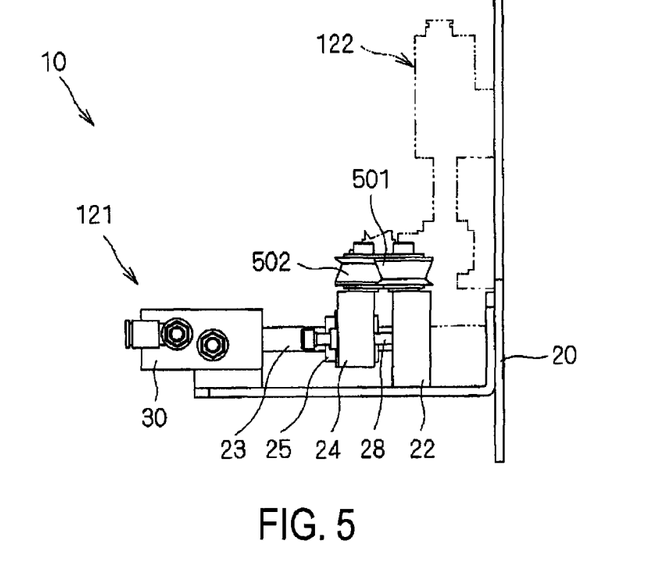
FIG. 5 is a rear view of the wire straightening apparatus.

Furthermore, the wire straightening apparatus 10 may be provided with path guiding portions 40 that guide the wire 2 to the wire feeding path R in the wire straightening apparatus 10 (see FIG. 2). The path guiding portions 40 are provided with insertion hole portions into which the wire 2 can be inserted, and the wire 2 is guided as an inner circumferential surface of the insertion hole portions contact an outer circumferential surface of the wire 2. These path guiding portions 40 are arranged at positions in which the insertion hole portions surround the wire feeding path R. Here, the path guiding portions 40 are fixed to the first support portions 22 that are fixed with respect to the base portion 20. More specifically, the path guiding portions 40 are arranged at three locations, that is, an upstream end portion and a downstream end portion of the first support portion 22 of the upstream-side wire straightening mechanism 121, and the downstream end portion of the first support portion 22 of the downstream-side wire straightening mechanism 122. A pipe-shaped portion is continuously arranged at the path guiding portion 40 that is arranged at the upstream end portion of the first support portion 22 of the upstream-side wire straightening mechanism 121.

Of course, the path guiding portions 40 can be omitted from the wire straightening apparatus 10. That is, the path guiding portions 40 can be arranged on equipment on which the wire straightening apparatus is arranged.

Additionally, the wire 2 is inserted through each path guiding portion 40, and while it is inserted onto the wire feeding path R between the plurality of first straightening rollers 501 and the plurality of second straightening rollers 502, the first support portions 22 and the second support portions 24 are moved to the proximate position. By so doing, the respective straightening rollers 501 and 502 contact the outer circumferential portion of the wire 2. In this state, if the wire 2 is fed from the wire feeding mechanism 80, the wire 2 receives a pressing force from each straightening roller 501 and 502 in the contacting/separating direction, and follows a meandering path through the plurality of first straightening rollers 501 and the plurality of second straightening rollers 502, as viewed from a direction perpendicular to rotational axes of the straightening rollers 501 and 502. Kinks of the wire 2 are straightened by the above operation.

<Concerning Straightening Rollers>

Figure 6:
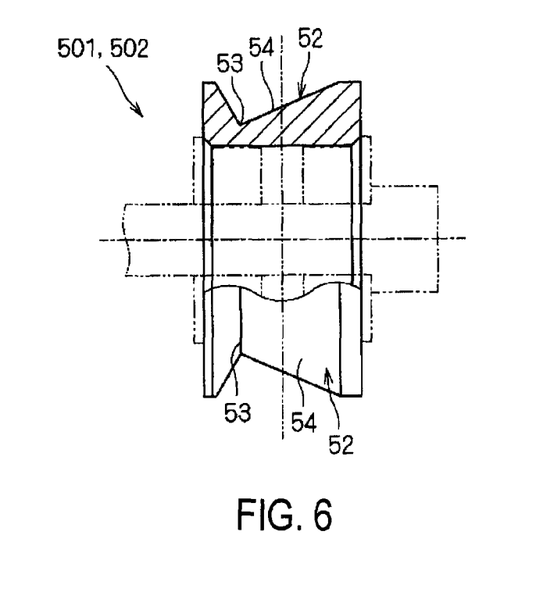
FIG. 6 is a front view showing a partial cross section of a straightening roller.
Figure 7:
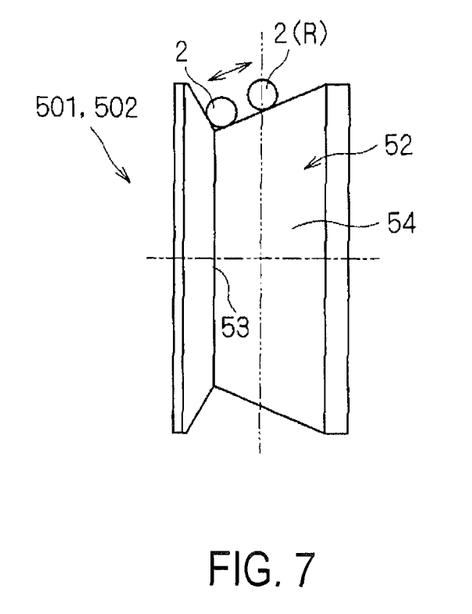
FIG. 7 is a front view of the straightening roller showing a path of a wire.

The plurality of first straightening rollers 501 and the plurality of second straightening rollers 502 are provided with grooves 52 that gradually deepen toward bottom portions 53 on the outer circumferential portions (see FIGS. 6 and 7). In this disclosure, "bottom portion of a groove" refers to the smallest-diameter part of a roller. More specifically, the grooves 52 of the respective straightening rollers 501 and 502 are formed in a substantially V shape in a cross-sectional view perpendicular to a circumferential direction.

Figure 8:
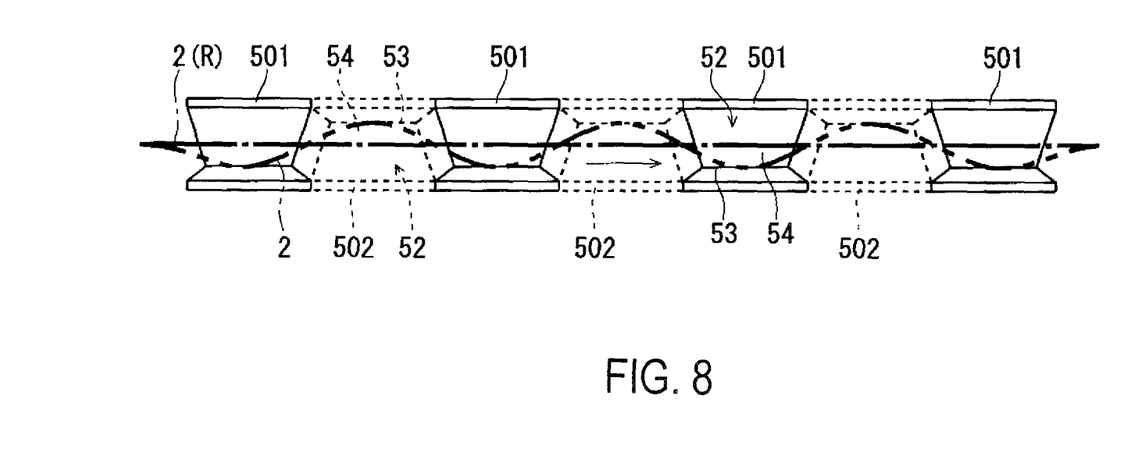
FIG. 8 is a front view of a plurality of straightening rollers showing a path of a wire.

The plurality of first straightening rollers 501 and the plurality of second straightening rollers 502 are arranged at positions in which the bottom portions 53 of the grooves 52 are shifted in an axial direction with respect to the wire feeding path R (see FIG. 8). More specifically, the plurality of first straightening rollers 501 are arranged at positions in which the bottom portions 53 of the grooves 52 are shifted to one side of the wire feeding path R in the axial direction, and the plurality of second straightening rollers 502 are arranged at positions in which the bottom portions 53 of the grooves 52 are shifted to the other side of the wire feeding path R in the axial direction.

Here, the plurality of first straightening rollers 501 and the plurality of second straightening rollers 502 are formed in a shape in which the bottom portions 53 of the grooves 52 are shifted from the center in the axial direction (see FIGS. 6 and 7). More specifically, in a cross-sectional view perpendicular to the circumferential direction, at the center of the grooves 52 in the axial direction, the plurality of first straightening rollers 501 and the plurality of second straightening rollers 502 are provided with wire straightening inclined surfaces 54 that are gradually inclined to the bottom portions on the inner circumferential side. That is, the straightening rollers 501 and 502 are provided with (i) the wire straightening inclined surfaces 54 in which one side is moderate, which sandwich the bottom portions 53 of the grooves 52, and (ii) inclined surfaces on the other side, which are more inclined than the wire straightening inclined surfaces 54.

Angles of the wire straightening inclined surfaces 54 may be set moderately to a degree that the wire 2 can upwardly and downwardly move along the straightening inclined surfaces 54 between the center and the bottom portions 53 of the grooves 52 of the straightening rollers 501 and 502 in the axial direction when switching between a state in which a wire feeding operation is suspended by the wire feeding mechanism 80 (wire feeding suspension state) and a state in which a wire feeding operation is being performed (wire feeding state). The angles of the wire straightening inclined surfaces 54 may be determined in consideration of the feeding speed of the wire by the wire feeding mechanism 80, a diameter of the wire 2 to be fed, etc.

The plurality of first straightening rollers 501 and the plurality of second straightening rollers 502 are supported opposite to each other in the axial direction. That is, in the direction along the wire feeding path R, the bottom portions 53 of the grooves 52 of the respective pluralities of straightening rollers 501 and 502 are alternatingly arranged in order on one side and the other side of the wire feeding path R in the axial direction. Here, the plurality of first straightening rollers 501 and the plurality of second straightening rollers 502 are aligned in the direction along the wire feeding path R in a state in which ends are arranged in the axial direction (see FIG. 8).

Additionally, in the wire feeding suspension state, in the grooves 52 of the plurality of first straightening rollers 501 and the plurality of second straightening rollers 502, the wire 2 is set so as to be along a path closer to the bottom portion 53 side than the center in the axial direction. More specifically, among the grooves 52 of the plurality of first straightening rollers 501 and the plurality of second straightening rollers 502, due to flexibility of the wire 2, the wire 2 tends to move down the wire straightening inclined surfaces 54 from the center position in the axial direction and be bent close to the bottom portion 53 side. Because of this, the wire 2 alternatingly contacts portions close to the bottom portions 53 of the wire straightening inclined surfaces 54 of the respective straightening rollers 501 and 502, and meanders in the axial direction while alternatingly contacting both sides of the wire feeding path R.

Furthermore, in the wire feeding state, the wire 2 passes substantially the center, in the axial direction, of the grooves 52 of the plurality of first straightening rollers 501 and the plurality of second straightening rollers 502. More specifically, due to tension caused by the wire feeding operation, the wire 2 tends to linearly move between the path guiding portions 40 that guide the wire 2 to the wire feeding path R. Because of this, between the plurality of first straightening rollers 501 and the plurality of second straightening rollers 502, the wire 2 moves up the wire straightening inclined surfaces 54 from positions close to the bottom portions 53 of the grooves 52 and passes positions substantially at the centers, in the axial direction.

<Concerning the Plurality of Wire Straightening Mechanisms>

Among the plurality of wire straightening mechanisms, in contrast to another wire straightening mechanism, at least one straightening mechanism is set such that the plurality of first straightening rollers 501 and the plurality of second straightening rollers 502 are spaced apart from each other at different intervals in a direction along the wire feeding path R. More specifically, the intervals between the plurality of first straightening rollers 501 and the plurality of second straightening rollers 502 in the direction along the wire feeding path R are set to be larger in a downstream-side wire straightening mechanism than in an upstream-side wire straightening mechanism. Here, as described above, the wire straightening apparatus 10 is provided with two wire straightening mechanisms: (i) the upstream-side wire straightening mechanism 121 and (ii) the downstream-side wire straightening mechanism 122. Furthermore, in the downstream-side wire straightening mechanism 122, the intervals between the plurality of first straightening rollers 501 and the plurality of second straightening rollers 502 in the direction along the wire feeding path R are set to be larger than in the upstream-side wire straightening mechanism 121 (see FIGS. 2 and 3).

Furthermore, here, in the downstream-side wire straightening mechanism 122, the intervals between the first support portions 22 and the second support portions 24 when the stoppers 28 contact the first support portions 22 are set to be larger than in the upstream-side wire straightening mechanism 121.

That is, in the downstream-side wire straightening mechanism 122, the intervals between the first straightening rollers 501 and the second straightening rollers 502 that are adjacent to each other are larger than the upstream-side wire straightening mechanism 121. Because of this, a pressing force that is received by the wire 2 through the respective straightening rollers 501 and 502 is smaller in the downstream-side wire straightening mechanism 122 than in the upstream-side wire straightening mechanism 121. More specifically, as the intervals between the first straightening rollers 501 and the second straightening rollers 502 that are adjacent to each other become large, the bending angle of the path of the wire 2 that passes between the plurality of first straightening rollers 501 and the plurality of second straightening rollers 502 becomes moderate, and a load applied to the wire 2 in the contacting/separating direction becomes small.

Here, the wire straightening apparatus 10 can straighten various types of wire 2 with small diameters (for example, 0.35 mm, 0.50 mm), intermediate diameters (for example, 0.75 mm), and large diameters (for example, 1.00 mm, 1.25 mm). Thus, the intervals, in the direction along the wire feeding path R, between the plurality of straightening rollers 501 and 502 of the upstream-side wire straightening mecha-nism 121, and the intervals between the first support portions 22 and the second support portions 24 when the stoppers 28 contact the first support portions 22, are respectively set so as to be suitable for straightening kinks of a wire 2 with a small diameter. Meanwhile, the intervals, in the direction along the wire feeding path R, between the plurality of straightening rollers 501 and 502 of the downstream-side wire straightening mechanism 122, and the intervals between the first support portions 22 and the second support portions 24 when the stoppers 28 contact the first support portions 22, are respectively set so as to be suitable for straightening kinks of a wire 2 with a large diameter.

Figure 9:
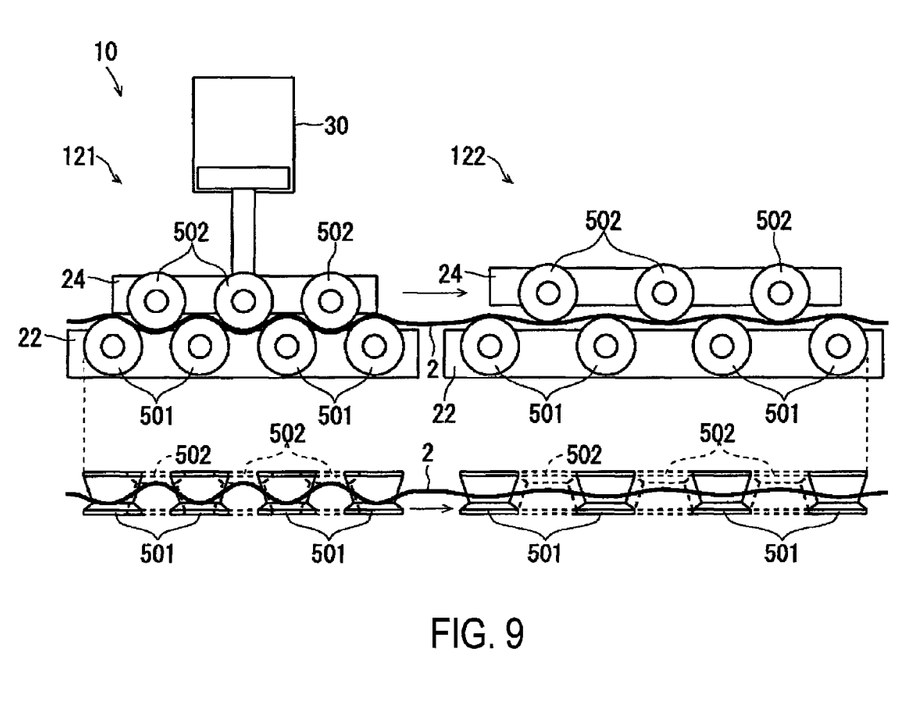
FIG. 9 is a diagram showing a wire straightening apparatus when a wire with a small diameter is subject to straightening.
Figure 10:
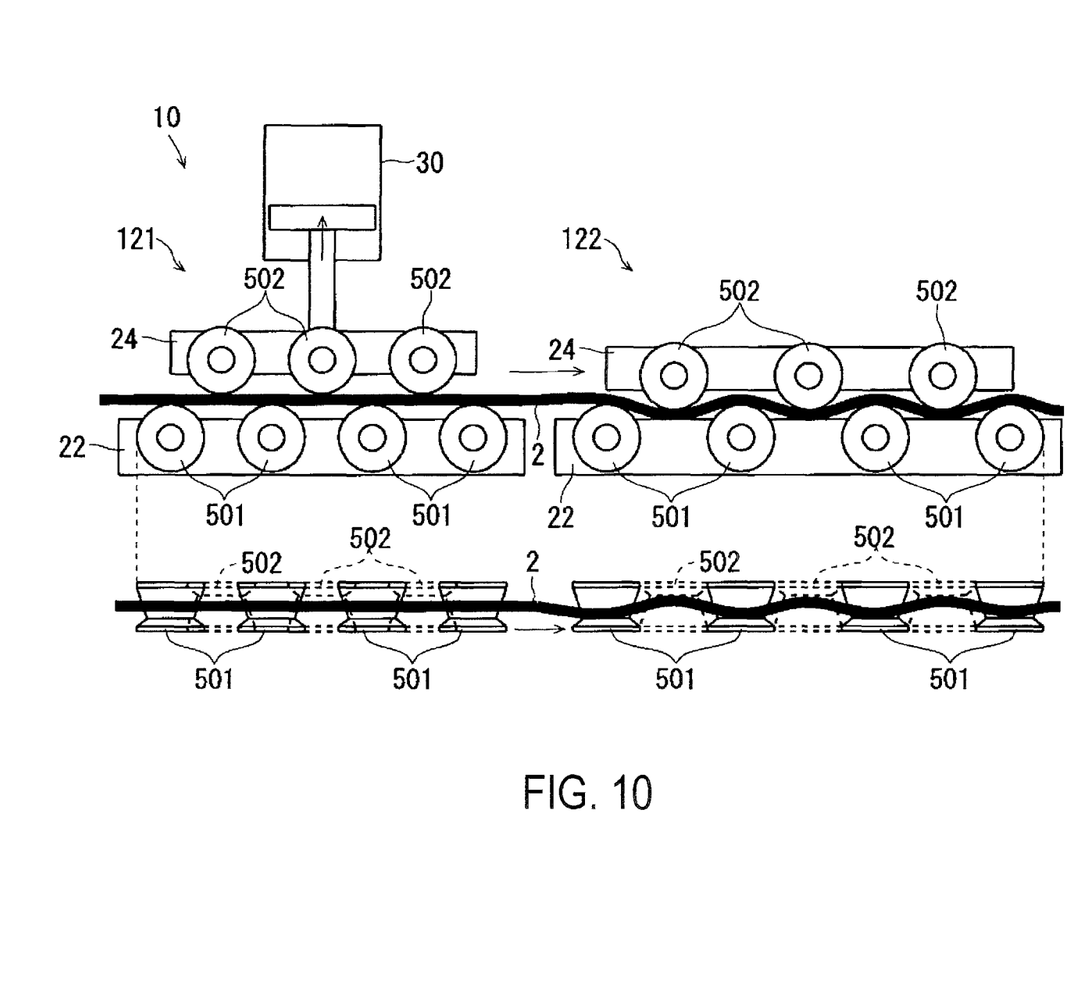
FIG. 10 is a diagram showing a wire straightening apparatus when a wire with a large diameter is subject to straightening.

Additionally, the urging force of the air cylinder 30 of the upstream-side wire straightening mechanism 121 is set to be smaller than that of the air cylinder 30 of the downstream-side wire straightening mechanism 122 (see FIGS. 9 and 10).

The urging force of the air cylinder 30 of the downstream-side wire straightening mechanism 122 is set at a magnitude suitable for straightening kinks of a wire 2 with a large diameter. That is, the urging force of the air cylinder 30 is set to be large enough that, when a wire 2 with a large diameter passes between the plurality of first straightening rollers 501 and the plurality of second straightening rollers 502, the first support portions 22 and the second support portions 24 are not separated from each other, due to the bending strength of the wire, from a state in which the stoppers 28 contact the first support portions 22. In other words, in the downstream-side wire straightening mechanism 122, a wire 2 with a large diameter can follow a meandering path through the plurality of first straightening rollers 501 and the plurality of second straightening rollers 502, as viewed from a direction perpendicular to rotational axes of the straightening rollers 501 and 502, while the stoppers 28 contact the first support portions 22.

The urging force of the air cylinder 30 of the upstream-side wire straightening mechanism 121 is set to be large enough that the plurality of first straightening rollers 501 and the plurality of second straightening rollers 502 interfere with a wire 2 with a small diameter on the wire feeding path R (so that a wire 2 with a small diameter is pressed and caused to pass along a curved path) when a wire 2 with a small diameter passes between the plurality of first straightening rollers 501 and the plurality of second straightening rollers 502. Preferably, this urging force is set to be large enough that the first support portions 22 and the second support portions 24 are not separated from each other, due to the bending strength of a wire 2 with a small diameter, from a state in which the stoppers 28 contact the first support portions 22. Additionally, the urging force of the air cylinder 30 is set to be small enough that a wire 2 with a large diameter arranged so as to pass between the plurality of straightening rollers 501 and 502 can be bent as little as possible in the contacting/separating direction. That is, the urging force is set to be at least small enough that the first support portions 22 and the second support portions 24 are separated from each other, due to the bending strength of a wire 2 with a large diameter, from a state in which the stoppers 28 contact the first support portions 22.

That is, the upstream-side wire straightening mechanism 121 is designed for a structure suitable for straightening a wire 2 with a small diameter, and the downstream-side wire straightening mechanism 122 is designed for a structure suitable for straightening a wire 2 with a large diameter.

<Wire Straightening Operation>

Figure 11:
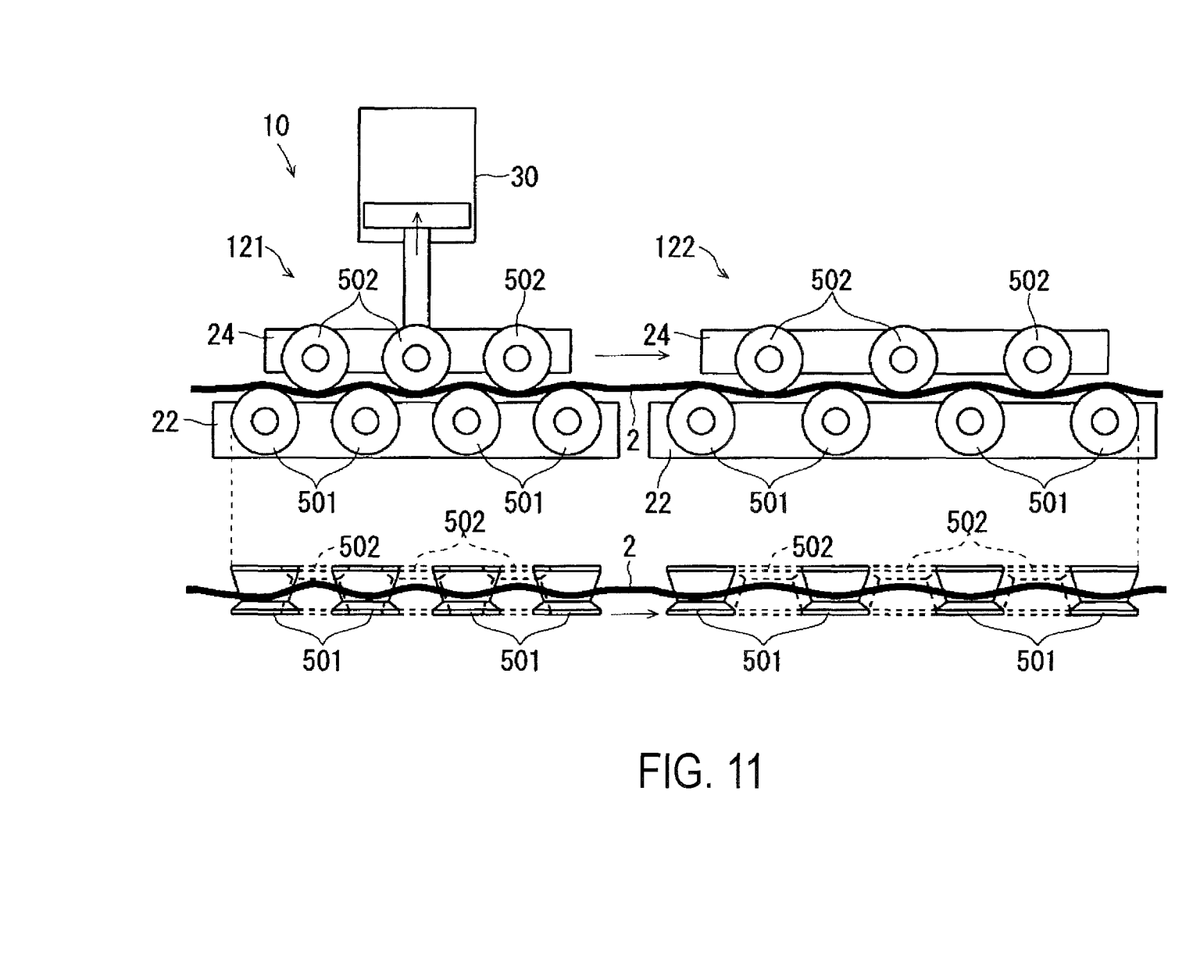
FIG. 11 is a diagram showing a wire straightening apparatus when a wire with a medium diameter is subject to straightening.

The following explains the action of an operation of straightening the wire 2 in the wire straightening apparatus 10. FIGS. 9-11 are schematic diagrams showing wire feeding suspension states of respective wire straightening apparatus 10 through which wires 2 with a small diameter, an intermediate diameter, and a large diameter are caused to pass. For the explanations, FIGS. 9-11 show the upstream-side wire straightening mechanism 121 and the downstream-side wire straightening mechanism 122 in the same posture.

In an initial state, the wire 2 is passed between the pluralities of first and second straightening rollers 501 and 502 of the upstream-side wire straightening mechanism 121 and the downstream-side wire straightening mechanism 122. Additionally, the first support portions 22 and the second support portions 24 are moved into proximity by the air cylinders 30. Thus, the wire 2 is in a wire feeding suspension state.

First, the action of an operation of straightening a wire 2 with a small diameter is explained (see FIG. 9). While the wire 2 with a small diameter is passed between the plurality of straightening rollers 501 and 502, in the upstream-side wire straightening mechanism 121, the stoppers 28 contact the first support portions 22. Additionally, in a wire feeding suspension state, the wire 2 with a small diameter passes positions close to the bottom portion 53 side of the grooves 52 from the centers, in the axial direction, of the plurality of straightening rollers 501 and 502. More specifically, in the upstream-side wire straightening mechanism 121, the wire 2 with a small diameter passes positions closer, in the axial direction, to the bottom portions 53 of the grooves 52 from the center, than in the downstream-side wire straightening mechanism 122, and is arranged on a path that has a larger meander, as seen from the contacting/separating direction, than in the downstream-side wire straightening mechanism 122.

Additionally, once the wire 2 with a small diameter begins to be fed from the wire feeding mechanism 80, it moves up the wire straightening inclined surfaces 54 toward the centers from the bottom portion 53 side of the grooves 52, in the axial direction of the plurality of straightening rollers 501 and 502.

Furthermore, in a wire feeding state, the wire 2 with a small diameter passes positions in the vicinity of the centers in the axial direction. More preferably, it may pass the positions of the centers, in the axial direction, and be fed on a linear path along the wire feeding path R as seen from the contacting/separating direction. Furthermore, the wire 2 with a small diameter passes along a path has a larger meander, in the contacting/separating direction, as seen from the axial direction, than in the wire feeding suspension state, and passes between the pluralities of straightening rollers 501 and 502 while receiving a greater pressing force from them than in the wire feeding suspension state.

Next, the action of an operation of straightening a wire 2 with a large diameter is explained (see FIG. 10). In a state in which the wire 2 with a large diameter is passed between the pluralities of straightening rollers 501 and 502, in the upstream-side wire straightening mechanism 121, due to the bending strength of the wire 2 with a large diameter, the second support portion 24 is pushed back in a direction in which the respective straightening rollers 501 and 502 are separated from each other, and the stoppers 28 are separated from the first support portion 22. Furthermore, in a wire feeding suspension state, the wire 2 with a large diameter passes along a substantially linear path in the upstream-side wire straightening mechanism 121 as seen from the contacting/separating direction, and passes along a meandering path in the downstream-side wire straightening mechanism 122. More specifically, in the downstream-side wire straightening mechanism 122, the wire 2 with a large diameter passes positions closer to the bottom portions 53 side of the grooves 52 from the center of the respective straightening rollers 501 and 502, in the axial direction. Furthermore, needless to say, the wire 2 with a large diameter that passes between the respective pluralities of straightening rollers 501 and 502 of the upstream-side wire straightening mechanism 121 may also meander slightly.

Additionally, once the wire 2 with a large diameter begins to be fed from the wire feeding mechanism 80, it moves up the wire straightening inclined surfaces 54 toward the center from the bottom portion 53 side of the grooves 52 in the axial direction of the respective pluralities of straightening rollers 501 and 502. Furthermore, in the upstream-side wire straightening mechanism 121, even when the wire 2 with a large diameter is arranged on a linear path in a wire feeding suspension state, a force that urges the wire 2 to be closer to the center, in the axial direction, becomes at least stronger than in the wire feeding suspension state.

In addition, in the wire feeding state, the wire 2 with a large diameter passes substantially the center positions in the axial direction. More preferably, the wire 2 with a large diameter may pass the center positions in the axial direction and be fed on a linear path along the wire feeding path R as seen from the contacting/separating direction. Furthermore, in the wire feeding state, in the upstream-side wire straightening mechanism 121, due to the bending strength of the wire 2 with a large diameter, the wire 2 with a large diameter pushes back the second support portions 24 and passes along a linear path as seen from the axial direction. Additionally, in the downstream-side wire straightening mechanism 122, the wire 2 with a large diameter passes along a path that has a larger meander, as seen from the axial direction, than in the wire feeding suspension state, and the wire 2 with a large diameter receives a greater pressing force from the plurality of straightening rollers 501 and 502 than in the wire feeding suspension state, and passes between the respective pluralities of straightening rollers 501 and 502.

Next, the action of an operation of straightening the wire 2 with an intermediate diameter is explained (see FIG. 11). In a state in which the wire 2 with an intermediate diameter is passed between the pluralities of straightening rollers 501 and 502, in the upstream-side wire straightening mechanism 121, the wire 2 with an intermediate diameter is pushed back in a direction in which the respective straightening rollers 501 and 502 are separated from each other due to the bending strength of the wire 2 with an intermediate diameter, and the stoppers 28 are separated from the first support portion 22. The separation distance of the stoppers 28 with respect to the first support portion 22 is smaller than in the case of the wire 2 with a large diameter. Naturally, in the case of the wire 2 with an intermediate diameter, depending on the size of the diameter (bending strength), the stoppers 28 may contact the first support portion 22, but a pushing force larger than in the case of the wire 2 with a small diameter acts on the straightening rollers 501 and 502. Additionally, in a wire feeding suspension state, the wire 2 with an intermediate diameter is arranged on a path that meanders past positions closer to the bottom portion 53 sides of the grooves 52 from the centers, in the axial direction, of the plurality of first and second straightening rollers 501 and 502, respectively. More specifically, in the upstream-side wire straightening mechanism 121, the wire 2 with an intermediate diameter passes positions closer to the center than in the case of the wire 2 with a small diameter, and closer to the bottom portions 53 of the grooves 52 than in the case of the wire 2 with a large diameter, and in the downstream-side wire straightening mechanism 122, it passes positions closer to the bottom portions 53 than in the case of the wire 2 with a small diameter and closer to the center than in the case of the wire 2 with a large diameter.

Additionally, once the wire 2 with an intermediate diameter beings to be fed from the wire feeding mechanism 80, the wire 2 with an intermediate diameter moves up the straightening inclined surfaces 54, in the axial direction of the pluralities of first and second straightening rollers 501 and 502, toward the centers from the bottom portion 53 sides of the grooves 52.

Furthermore, in the wire feeding state, the wire 2 with an intermediate diameter passes position in the vicinity of the center in the axial direction. More preferably, it may pass positions of the center of the axial direction and be fed on a linear path along the wire feeding path R as seen from the contacting/separating direction. Thus, in the wire feeding state, the wire 2 with an intermediate diameter passes along a path that has a larger meander than in the wire feeding suspension state, as seen from the axial direction, and passes between the pluralities of straightening rollers 501 and 502 while receiving a greater pressing force from them than in the wire feeding suspension state.

According to the wire straightening apparatus 10 related to the above-mentioned structures, the plurality of straightening rollers 501 that are journaled to the first support portions 22 and the plurality of straightening rollers 502 that are journaled to the second support portions 24 are arranged at positions in which the bottom portions 53 of the grooves 52 are shifted in the axial direction with respect to the wire feeding path R. Thus, the wire 2 is displaced from the wire feeding path R to a path close to the bottom portions 53 of the grooves 52 of the straightening rollers 501 and 502 due to the bending strength of the wire 2 itself. Additionally, in the wire feeding state, the wire 2 passes along the wire feeding path, contacts the straightening inclined surfaces 54, which have a larger diameter than the bottom portions 53 of the grooves 52 of the respective straightening rollers 501 and 502, and passes between the pluralities of first and second straightening rollers 501 and 502 while receiving a pressing force from the respective straightening rollers 501 and 502. By so doing, compared to the wire feeding state, the wire 2 in a wire feeding suspension state receives a smaller pressing force from the plurality of first straightening rollers 501 and the plurality of second straightening rollers 502, and the formation of kinks caused by the receipt of that pressing force can be suppressed. Meanwhile, compared to the wire feeding suspension state, the wire 2 in the wire feeding state receives a larger pressing force from the plurality of first straightening rollers 501 and the plurality of second straightening rollers 502, and the kink straightening effect can be more reliably obtained.

Furthermore, in this wire straightening apparatus 10 as well, in the wire feeding suspension state, the wire 2 curves and meanders in the axial direction of the respective straightening rollers 501 and 502. However, it is considered that this is because the wire 2 deforms due to its own flexibility, and that it is more difficult to form kinks than the case in which the wire 2 is bent and meanders in a state in which it is pushed by the straightening rollers 501 and 502 that are (indirectly) urged by the air cylinders 30.

Additionally, the plurality of first straightening rollers 501 are arranged at positions in which the bottom portions 53 of the grooves 52 are shifted to one side of the wire feeding path R in the axial direction, and the plurality of second straightening rollers 502 are arranged at positions in which the bottom portions 53 of the grooves 52 are shifted to the other side of the wire feeding path R in the axial direction. Thus, the kink straightening effect can be improved.

Furthermore, the plurality of first straightening rollers 501 and the plurality of second straightening rollers 502 are formed in a shape in which the bottom portions 53 of the grooves 52 are shifted from the center in the axial direction. Thus, the plurality of first straightening rollers 501 are arranged at a position in which the bottom portions 53 of the grooves 52 are shifted to one side of the wire feeding path R in the axial direction, and opposite to the plurality of first straightening rollers 501 in the axial direction, the plurality of second straightening rollers 502 are arranged at a position in which the bottom portions 53 of the grooves 52 are shifted to the other side of the wire feeding path R in the axial direction. Thus, the dimension of the straightening mechanisms 121 and 122 in the axial direction can be reduced, and space reduction can be achieved.

Additionally, in the upstream-side wire straightening mechanism 121 and downstream-side wire straightening mechanism 122, the intervals between the plurality of first straightening rollers 501 and the plurality of second straightening rollers 502 in the direction along the wire feeding path R are different, so the kinks of wires 2 of a plurality of types of wire diameters can be straightened.

Furthermore, the intervals between the plurality of first straightening rollers 501 and the plurality of second straightening rollers 502 in the direction along the wire feeding path R are set to be larger in the downstream-side wire straightening mechanism 121 than in the upstream-side wire straightening mechanism 122, so the kink straightening effect can be improved. In particular, kinks of a wire 2 with an intermediate diameter can be gradually straightened, and a highly effective kink straightening effect can be achieved.

Additionally, the respective straightening mechanisms 121 and 122 are provided with the air cylinders 30 that relatively urge the first support portions 22 and the second support portions 24, which are arranged so as to be relatively movable in directions of contact and separation, into proximity with each other. The air cylinder 30 of the upstream-side wire straightening mechanism 121 is set such that its urging force is smaller than that of the air cylinder 30 of the downstream-side wire straightening mechanism 122. Thus, in the upstream-side wire straightening mechanism 121 in which the intervals between the plurality of first straightening rollers 501 and the plurality of second straightening rollers 502 in the direction along the wire feeding path R are small, and resistance against extending the wire 2 tends to become large, even a wire 2 with a large diameter with a high bending strength can be smoothly extended.

Up to this point, with respect to the wire straightening apparatus 10, an example of a structure with two straightening mechanisms 121 and 122 has been used for an explanation. However, a structure with one or a plurality of straightening mechanisms (three straightening mechanisms or more) may also be used.

Furthermore, the plurality of first straightening rollers 501 and the plurality of second straightening rollers 502 may be formed in a shape in which the bottom portions of the grooves are positioned at the center in the axial direction. In this case as well, the plurality of first straightening rollers 501 and the plurality of second straightening rollers 502 may be arranged at positions in which the bottom portions of the grooves are shifted with respect to the wire feeding path R. Additionally, both the plurality of first straightening rollers 501 and the plurality of second straightening rollers 502 may be arranged at positions so as to shift the bottom portions of the grooves with respect to the wire feeding path R on one side in the axial direction, or they may be arranged at positions so as to shift the bottom portions of the grooves with respect to the wire feeding path R in different directions parallel to the rotational axes. Thus, in this case, in a wire feeding state, the wire 2 passes between the respective straightening rollers 501 and 502 on a path substantially along the wire feeding path R as seen from the contacting/separating direction, and in a wire feeding suspension state, the wire 2 is arranged on a path that passes positions close to the bottom portions 53 of the grooves 52 of the respective straightening rollers 501 and 502.

Furthermore, the first support portion 22 and the second support portion 24 are not limited to the case of being separate members that are arranged so as to be relatively movable in direction of contact and separation. They may be aligned and formed integrally, and the plurality of first straightening rollers 501 may be spaced apart from each other and journaled on a line along the wire feeding path R, and the plurality of second straightening rollers 502 may be spaced apart from each other and journaled on a different line along the wire feeding path R.

Additionally, the structure is not limited to one in which the intervals between the plurality of first straightening rollers 501 and the plurality of second straightening rollers 502 in the direction along the wire feeding path R are set to be smaller in the downstream-side wire straightening mechanism 122 than in the upstream-side wire straightening mechanism 121. That is, in at least one of the plurality of straightening mechanisms, if the intervals between the plurality of first straightening rollers 501 and the plurality of second straightening rollers 502 are set to be different from those in another straightening mechanism, kinks of a plurality of types of wires 2 can be more effectively straightened.

A wire straightening apparatus 10 is explained above in detail, but the above-mentioned explanation is an example in all aspects, and this invention is not limited to the above-mentioned explanation. It is construed that countless modifications that are not shown as examples here are conceivable within the scope of this invention.

EXPLANATION OF THE SYMBOLS

2 Wire
10 Wire straightening apparatus
22 First support portions
24 Second support portions
30 Air cylinders
52 Grooves
53 Bottom portions
121 Upstream-side wire straightening mechanism
122 Downstream-side wire straightening mechanism
501 First straightening rollers
502 Second straightening rollers
R Wire feeding path

What is claimed is:

1. A wire straightening apparatus that straightens kinks of a wire that is fed along a wire feeding path, comprising:
   one or a plurality of straightening mechanisms,
   each straightening mechanism comprising:
      a first support portion;
      a second support portion that is arranged facing the first support portion;
      a plurality of first straightening rollers spaced apart in a direction along the wire feeding path, each first straightening roller having (i) an outer periphery and (ii) a groove along the outer periphery, the groove gradually deepening toward a bottom portion, each first straightening roller being rotatably mounted on the first support portion; and
      one or a plurality of second straightening rollers, each second straightening roller having (i) an outer periphery and (ii) a groove along the outer periphery, the groove gradually deepening toward a bottom portion, a first side of the groove being defined by an inclined first surface that extends from the bottom portion toward a first plane perpendicular to a rotation axis of the roller and crosses the wire feeding path, and a second side of the groove being defined by a second surface that extends from the bottom portion toward a second plane perpendicular to the rotation axis, the inclined first surface being wider than the second surface, an angle between (i) the inclined first surface and (ii) a line that is parallel to the rotation axis and extends from the bottom portion toward the first plane being less than an angle between (i) the second surface and (ii) a line that is parallel to the rotation axis and extends from the bottom portion toward the second plane, each second straightening roller being rotatably mounted on the second support portion, an axis of each second straightening roller being between respective axes of two of the first straightening rollers in the direction along the wire feeding path,
   wherein the bottom portion of the groove of each first straightening roller is spaced from the wire feeding path in a first direction, and the bottom portion of the groove of each second straightening roller is spaced from the wire feeding path in a second direction opposite to the first direction.

2. The wire straightening apparatus as set forth in claim 1, wherein each first and second straightening roller has a center, in a rotational axis direction, and is formed in a shape such that the bottom portion of the groove is shifted from the center in the rotational axis direction.

3. The wire straightening apparatus as set forth in claim 1, comprising:
   a plurality of the straightening mechanisms,
   wherein at least one of the straightening mechanisms is set such that intervals between the first and second straightening rollers in the direction along the wire feeding path are different from intervals between the first and second straightening rollers in the direction along the wire feeding path in another of the straightening mechanisms.

4. The wire straightening apparatus as set forth in claim 3, wherein the intervals between the first straightening rollers and second straightening rollers in the direction along the wire feeding path are set to be larger in a downstream-side straightening mechanism than in an upstream-side straightening mechanism.

5. The wire straightening apparatus as set forth in claim 4, wherein the first and second support portions are arranged so as to be relatively movable in directions of contact with and separation from each other,
the straightening mechanisms are further provided with urging portions that relatively urge the first and second support portions into proximity with each other, and
an urging force of the urging portion of the upstream-side straightening mechanism is set to be smaller than that of the urging portion of the downstream-side straightening mechanism.

6. The wire straightening apparatus as set forth in claim 3, wherein rotational axes of the first and second straightening rollers in one of the straightening mechanisms are parallel to a first direction, and rotational axes of the first and second straightening rollers in another of the straightening mechanisms are parallel to a second direction that is perpendicular to the first direction.

7. A wire straightening apparatus that straightens kinks of a wire that is fed along a wire feeding path, comprising:
a plurality of straightening mechanisms,
each straightening mechanism comprising:
- a first support portion;
- a second support portion that is arranged facing the first support portion;
- a plurality of first straightening rollers spaced apart in a direction along the wire feeding path, each first straightening roller having (i) an outer periphery and (ii) a groove along the outer periphery, the groove gradually deepening toward a bottom portion, each first straightening roller being rotatably mounted on the first support portion; and
- one or a plurality of second straightening rollers, each second straightening roller having (i) an outer periphery and (ii) a groove along the outer periphery, the groove gradually deepening toward a bottom portion, each second straightening roller being rotatably mounted on the second support portion, an axis of each second straightening roller being between respective axes of two of the first straightening rollers in the direction along the wire feeding path, wherein the bottom portion of the groove of each first straightening roller is spaced from the wire feeding path in a first direction, and the bottom portion of the groove of each second straightening roller is spaced from the wire feeding path in a second direction opposite to the first direction, and wherein at least one of the straightening mechanisms is set such that intervals between the first and second straightening rollers in the direction along the wire feeding path are different from intervals between the first and second straightening rollers in the direction along the wire feeding path in another of the straightening mechanisms.

8. The wire straightening apparatus as set forth in claim 7, wherein the intervals between the first straightening rollers and second straightening rollers in the direction along the wire feeding path are set to be larger in a downstream-side straightening mechanism than in an upstream-side straightening mechanism.

9. The wire straightening apparatus as set forth in claim 8, wherein the first and second support portions are arranged so as to be relatively movable in directions of contact with and separation from each other,
the straightening mechanisms are further provided with urging portions that relatively urge the first and second support portions into proximity with each other, and
an urging force of the urging portion of the upstream-side straightening mechanism is set to be smaller than that of the urging portion of the downstream-side straightening mechanism.

10. The wire straightening apparatus as set forth in claim 7, wherein rotational axes of the first and second straightening rollers in one of the straightening mechanisms are parallel to a first direction, and rotational axes of the first and second straightening rollers in another of the straightening mechanisms are parallel to a second direction that is perpendicular to the first direction.

* * * * *